United States Patent
Flordal

(10) Patent No.: US 10,642,343 B2
(45) Date of Patent: May 5, 2020

(54) DATA PROCESSING SYSTEMS

(71) Applicant: ARM Limited, Cambridge (GB)

(72) Inventor: Lars Oskar Flordal, Uppsala (SE)

(73) Assignee: ARM Ltd, Cambridge (GB)

( * ) Notice: Subject to any disclaimer, the term of this patent is extended or adjusted under 35 U.S.C. 154(b) by 0 days.

(21) Appl. No.: 15/590,300

(22) Filed: May 9, 2017

(65) Prior Publication Data

US 2017/0329395 A1 Nov. 16, 2017

(30) Foreign Application Priority Data

May 10, 2016 (GB) .................................. 1608153.1

(51) Int. Cl.
| | |
|---|---|
| G06F 3/01 | (2006.01) |
| G09G 5/393 | (2006.01) |
| G06F 3/14 | (2006.01) |
| H04N 19/42 | (2014.01) |
| H04N 19/20 | (2014.01) |
| G06T 1/60 | (2006.01) |
| G06T 11/00 | (2006.01) |
| G06T 15/00 | (2011.01) |
| G06T 15/04 | (2011.01) |
| G09G 5/36 | (2006.01) |

(52) U.S. Cl.
CPC ............... *G06F 3/011* (2013.01); *G06F 3/14* (2013.01); *G06T 1/60* (2013.01); *G06T 11/001* (2013.01); *G06T 15/005* (2013.01); *G06T 15/04* (2013.01); *G09G 5/363* (2013.01); *G09G 5/393* (2013.01); *H04N 19/20* (2014.11); *H04N 19/42* (2014.11); *G09G 2360/06* (2013.01); *G09G 2360/08* (2013.01); *G09G 2360/10* (2013.01)

(58) Field of Classification Search
CPC ...................................................... G06F 3/011;
H04N 19/20; G06T 1/60; G06T 11/001;
G06T 15/005; G06T 15/04
USPC ................................ 345/581, 582, 583, 619
See application file for complete search history.

(56) References Cited

U.S. PATENT DOCUMENTS

| | | | | |
|---|---|---|---|---|
| 5,714,997 | A * | 2/1998 | Anderson | ............ G02B 27/017 348/39 |
| 6,326,984 | B1 * | 12/2001 | Chow | .................... G09G 5/022 345/506 |
| 2010/0328425 | A1 | 12/2010 | Nagaraj et al. | |
| 2011/0032251 | A1 | 2/2011 | Pothana | |

(Continued)

OTHER PUBLICATIONS

Nickolls, J., & Kirk, D. (2009). Graphics and computing GPUs. Computer Organization and Design: The Hardware/Software Interface, DA Patterson and JL Hennessy, 4th ed., Morgan Kaufmann, A2-A77.*

(Continued)

*Primary Examiner* — Sarah Lhymn
(74) *Attorney, Agent, or Firm* — Vierra Magen Marcus LLP

(57) ABSTRACT

In a data processing system that includes a graphics processor and a video processor, graphics textures for use by the graphics processor are stored as encoded frames of video data. The video processor then decodes the video frames to reproduce the graphics texture(s) that the video frames encode, and stores the decoded graphics texture or textures in memory for use by the graphics processor.

The graphics processor then reads the decoded graphics textures for use when generating its render outputs, such as output frames for display.

17 Claims, 6 Drawing Sheets

(56) References Cited

U.S. PATENT DOCUMENTS

2014/0096147 A1\* 4/2014 Aarts .................... G06F 9/4484
                                                    719/320
2014/0139513 A1   5/2014 Mammou
2016/0057441 A1\* 2/2016 Skupin ................. H04N 19/137
                                                    375/240.25

OTHER PUBLICATIONS

Combined Search and Examination Report dated Nov. 3, 2016, in UK Patent Appl. No. GB1608153.1.

\* cited by examiner

DATA PROCESSING SYSTEMS

BACKGROUND

The technology described herein relates to data processing systems, and in particular to data processing systems, e.g. implemented as a System-on-Chip, that include both a graphics processing unit (a graphics processor) and a video decoder (e.g. in the form of a video processor).

FIG. 1 shows an exemplary data processing system 100 that includes a system on chip (SoC) 102, main memory 116, and a display 118.

The SoC 102 comprises a central processing unit (CPU) 104, a graphics processing unit (GPU) 106, a video (coding) engine (processor) 108, a display controller 110, an interconnect 112 and a memory controller 114.

As is shown in FIG. 1, the CPU 104, GPU 106, video engine 108, and display controller 110 communicate with each other via the interconnect 112 and with the memory 116 via the interconnect 112 and memory controller 114. The display controller 110 also communicates with the display 118.

In such a data processing system, the graphics processing unit 106 will generate render outputs, such as output frames to be displayed, and then, e.g., store them in the memory 116 from where they can, e.g., be retrieved, e.g, by the display controller 110 for providing to and displaying on the display 118.

As part of such graphics processing, it is common to perform so called "texture mapping", i.e. to generate colours (or other data) for sampling positions of the render output, such as an output frame for display, by applying so-called textures or texture data to the surfaces to be rendered. For example, surface detail on objects may be generated by applying a pre-defined "texture" to a set of primitives representing the object. Such textures are typically provided as a stored array of texture elements or "texels", each representing given texture data (such as colour, luminance, or light/shadow, etc., values), with the texels then being mapped onto the corresponding elements, such as (and, indeed, typically) a set of sampling positions, for the render output being generated. The stored arrays of texture elements (data) are typically referred to as "texture maps".

Texture maps may, e.g., be pre-defined, and provided, e.g., with the application (e.g. game) that requires the graphics processing. Additionally or alternatively, a graphics processing unit may be controlled to generate a texture or textures that it will then subsequently use when generating a further render output, such as an output frame for display.

In such arrangements, the texture or textures to be used will typically be stored in the memory 116, and then the data for those textures will be read in appropriately by the graphics processing unit 106 (or other elements of the data processing system 100) when that data is required.

The use of textures and texture mapping can provide higher image quality, but has a number of drawbacks. In particular, the storage of the texture data and accessing it in use can place, e.g., high storage and bandwidth requirements on a graphics processing device. This is particularly significant for mobile (portable) devices that perform graphics processing, as such devices are inherently limited in their e.g., storage, bandwith and power resources and capabilities.

The Applicants believe that there remains scope for improved handling and use of textures and texture data in data processing systems that include a graphics processor that uses texture data.

BRIEF DESCRIPTION OF DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
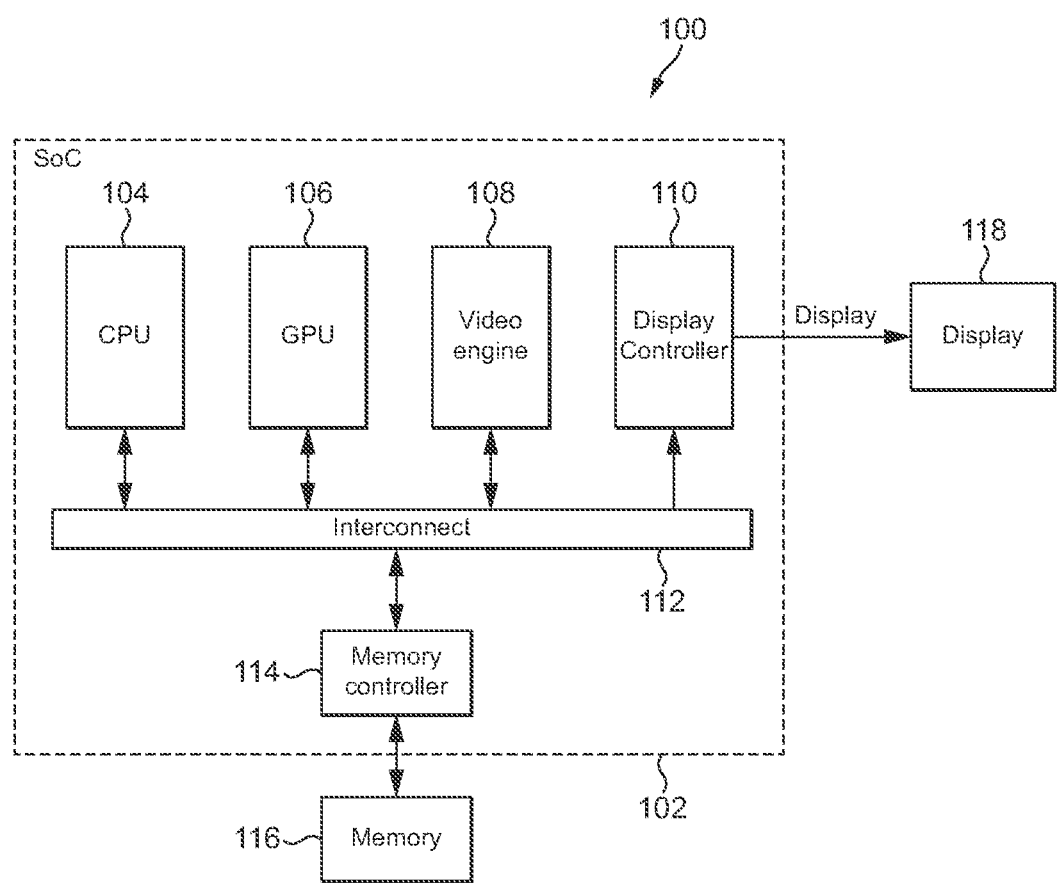
FIG. 1 shows an exemplary data processing system.

A first embodiment of the technology described herein comprises a method of operating a data processing system that comprises a video decoder, a graphics processor, and a memory for storing data generated by or to be used by the video decoder and the graphics processor, the method comprising:

the video decoder decoding some or all of a graphics texture that has been encoded as a video frame or frames and storing the decoded graphics texture in the memory; and the graphics processor reading the decoded texture stored in the memory by the video decoder and using the texture to generate a render output.

A second embodiment of the technology described herein comprises a data processing system, comprising:

a video decoder;

a graphics processor; and a memory for storing data generated by or to be used by the video decoder and the graphics processor;

wherein:

the video decoder is operable to decode some or all of a graphics texture that has been encoded as a video frame or frames and store the decoded graphics texture in the memory; and the graphics processor is operable to read a decoded texture stored in the memory by the video decoder and use the texture to generate a render output.

The technology described herein relates to data processing systems that include both a video decoder and a graphics processor. In the technology described herein, graphics textures to be used by the graphics processor when generating a render output are provided in the form of encoded video frames, and then decoded by the video decoder for use as textures by the graphics processor.

The applicants have recognised in this regard when a graphics processor is performing graphics processing, a video decoder (e.g. video processor) of the data processing system that the graphics processor is part of may not necessarily be active. The technology described herein takes advantage of this, by using the video processor to decode and process graphics textures for use by the graphics processor, thereby removing that processing burden from the graphics processor itself.

The applicants have also recognised that it is possible to appropriately and efficiently encode (e.g. compress) graphics textures using video encoding techniques, such that those encoded textures can then be processed by a video decoder for provision to a graphics processor for use when generating a render output.

Providing graphics textures to be used by a graphics processor in the form of encoded video data, and then using a video decoder of a data processing system that the graphics processor is part of to decode the textures into a form suitable for use by the graphics processor, facilitates exploiting and using the processing power of the video decoder to assist the graphics processor when the graphics processor is performing rendering using graphics textures. This can therefore, for example, remove some of the texture processing burden (e.g. the need to decompress a compressed texture before it can be used by the graphics processor) from the graphics processor itself, thereby better exploiting the processing resources available in the data processing system.

This can accordingly facilitate, e.g., more efficient and effective use of graphics textures even in data processing systems that may have more limited graphics processing resources.

The technology described herein can also allow, for example, more complex texture operations and effects e.g., in real time, to be used than would be the case where all of the texture processing (including any necessary decoding (decompressing) of the textures) has to be performed by the graphics processor.

The technology described herein also extends to the corresponding encoding of graphics textures for use by a graphics processor as a video frame or frames using a video encoding format.

Thus, a further embodiment of the technology described herein comprises a method of encoding a set of texture data elements to be used for graphics processing, the method comprising:

encoding the set of texture data elements as a video frame or frames using a video encoding process.

A further embodiment of the technology described herein comprises an apparatus for encoding a set of texture data elements to be used for graphics processing, the apparatus comprising:

processing circuitry configured to encode a set of graphics texture data elements as a video frame or frames using a video encoding process.

The texture data that is encoded and decoded as video frames can be any suitable and desired form of texture data. Texture data, in its original, raw or unencoded form, is typically arranged in the form of arrays of texture elements or texels, and thus in an embodiment, the encoded texture(s) comprise an array of texture data elements (texels). A texture may be a 2-dimensional (2D) array, or a 3-dimensional array (3D) (a "volume texture") (indeed, it is an advantage of the technology described herein that it can be used to handle 3-dimensional textures in an efficient manner). (In the case of a 3D, volume texture, the texture data elements may also be referred to as "voxels" (volume elements).)

The textures and the texture data elements can represent any suitable texture data. In an embodiment the texture is a texture that is to be used for graphics processing, e.g., and in an embodiment, when rendering an image and/or frame for display, such as for example an image to be applied to primitives to be rendered, colours (including grayscale), luminances, bump-maps, shadow-maps (light-maps), etc.

However, the technology described herein can also be used for textures to be used to process, and that represent, other forms of data, e.g. where it is desired to use a graphics texture (and graphics texture processing) to represent and process other forms of data. For example, textures can be and are used in graphics processing to represent and process many different kinds of data, such as, 3D fog, flow fields, etc. as well as for "traditional" graphics purposes. The technology described herein can equally be applied to, and extends to, these kinds and uses of textures in, and for, graphics processing systems. Thus the textures in the technology described herein may represent other forms of data that are to be processed as a texture in a graphics processing system, if desired.

In an embodiment, the texture data elements each represent a colour value for a texture element. In this case, the texture data elements in their original, unencoded form may each comprise a set of colour values (Red, Green, Blue (RGB), a set of colour and transparency values (Red, Green, Blue, Alpha (RGBa)), or a set of luminance and chrominance values, and the encoded data, when decoded (reproduced), will generate a corresponding set of colour values.

The texture data elements could each represent other forms of data, if desired.

In the case of shadow (light)-maps, for example, the texture data elements, will each comprise or represent a set of data values indicating, e.g., whether the texture element is in light or in shadow, and/or the amount (and/or colour) of the light or shadow for that texture element. Similarly, for a normal-map (bump-map), the data for each texture element will be a set of values indicating the direction in which light will be reflected at that texture element.

The texture data elements could also, e.g., represent z values (depth values), stencil values, luminance values (luminance textures), luminance-alpha-textures, and/or gloss-maps (i.e. whether a surface is shiny at the texture element position or not), etc.

The texture or textures to be encoded as a video frame or frames can be generated as desired, e.g., and in an embodiment, in the normal way for generating the textures in question and for use in the data processing system and by the graphics processor in question. The graphics textures may, e.g., be generated "off-line", e.g. when preparing the data for the application (e.g. game) that the texture relates to, and/or they may be generated "in use", e.g. in the case where the graphics processor is configured to generate a texture or textures that it will then subsequently use when generating a render output.

Correspondingly, the encoding of graphics textures as a video frame or frames may be, and in one embodiment is, performed "off-line" (i.e. in advance), with the so-encoded texture then being stored, e.g. as part of the data for the application (e.g. game) that the texture relates to, for subsequent use when the application is executed. In this case, the encoded texture (a video frame or frames encoding the texture) may, e.g., be stored on a portable storage device such as a DVD, for later use, e.g. when it is desired to apply the texture to an image to be rendered, and/or may be stored on other storage e.g. for downloading, by and/or streaming to, the data processing system when the texture or textures is to be used.

Additionally or alternatively, the encoding could be performed "in use", e.g. as the graphics processor is performing graphics processing to generate render outputs. In this latter case, for example, the graphics processor could be controlled to generate a texture as a render output, with a video encoder of the data processing system then encoding that texture and storing the encoded texture, e.g., for future use, and/or for export.

Thus, in an embodiment, the technology described herein further comprises the graphics processor generating a graphics texture as a render output and storing the graphics texture in the memory of the data processing system, and a video encoder of the data processing system then reading the stored graphics texture from the memory, encoding the graphics texture as one or more frames of video data using a video encoding process, and then storing the encoded texture in the memory.

Correspondingly, a further embodiment of the technology described herein comprises a method of operating a data processing system that comprises a video encoder, a graphics processor, and a memory for storing data generated by or to be used by the video encoder and the graphics processor, the method comprising:

the graphics processor generating a graphics texture as a render output and storing the graphics texture in the memory of the data processing system; and the video encoder reading the stored graphics texture from the memory, encoding the graphics texture as one or more frames of video data using a video encoding process, and then storing the frames of video data encoding the graphics texture in memory.

A further embodiment of the technology described herein comprises a data processing system comprising:

a video encoder;

a graphics processor; and a memory for storing data generated by or to be used by the video encoder and the graphics processor; wherein:

the graphics processor is operable to generate a graphics texture as a render output and store the graphics texture in the memory of the data processing system; and the video encoder is operable to read the stored graphics texture from the memory, encode the graphics texture as one or more frames of video data using a video encoding process, and then store the frames of video data encoding the graphics texture in memory.

As will be appreciated by those skilled in the art, these embodiments of the technology described herein can, and in an embodiment do, include any one or more, or all of the features of the technology described herein, as appropriate.

A texture (the texture data) can be encoded as a video frame or frames using any suitable and desired video encoding process. Correspondingly, the video encoding can be carried out in any suitable and desired manner on or using the original texture data that is to be encoded. Any suitable and desired video encoding process can be used for encoding texture data for use in the manner of the technology described herein, such as H.264, HEVC, VP9, etc.

A graphics texture may be encoded as a single video frame or as plural video frames. This may, e.g., and in an embodiment does, depend upon the nature and/or, e.g., size, of the texture that is being encoded as a video frame or frames.

In an embodiment, a graphics texture is encoded and stored as a single video frame. This may reduce the video frame processing overheads.

In an embodiment, a graphics texture is encoded and stored as plural video frames. This may facilitate the use of video compression techniques, such as motion estimation, between the different frames representing the texture.

In an embodiment, the graphics texture that is encoded as a video frame or frames comprises a "volume" texture (a three dimensional texture array). In this case, each layer of the volume texture will be represented as a respective two dimensional array of texture data element values that can then accordingly be encoded using the video encoding process.

In such an arrangement, in an embodiment, each separate layer of the volume texture is encoded as a separate video frame. In that case therefore, the texture will be encoded as a sequence of video frames, with each video frame representing a respective layer in the volume texture. This may facilitate, for example, using motion estimation to enhance the compression of the sequence of video frames representing the volume texture.

In another embodiment, plural layers (and in an embodiment all the layers) of the volume texture are encoded and stored in (as) a single video frame, with each individual layer of the volume texture being a respective region of the (single) video frame. This may help to reduce the frame processing overhead when decoding the volume texture.

In this arrangement, the video decoder is in an embodiment provided with appropriate information to allow each individual volume texture layer within the video frame to be identified. This can be done in any suitable and desired manner, for example, by indicating a "stride" between different layers in the video frame to allow the different volume texture layers in the video frame to be identified (and in an embodiment, this is what is done).

The encoding of the graphics textures and texture data as video frames using a video encoding process in an embodiment exploits any encoding optimisations, such as, and in an embodiment, compression optimisations, that the video encoding process can use.

Thus, in an embodiment, the encoding of a graphics texture or textures as a video frame or frames uses motion estimation to try to compress the encoded texture data. In this case, the motion estimation is in an embodiment applied at least between different video frames representing graphics texture(s) (e.g. in the case where a single graphics texture is represented as a sequence of video frames, or where a set or sequence of graphics textures is represented as a set or sequence of video frames). In an embodiment, where the video encoding process supports this, motion estimation is, additionally or alternatively, used within a single video frame representing a graphics texture that is being encoded. This may be particularly applicable where, for example, a single video frame is being used to encode plural layers of a volume texture.

The use of motion estimation may be particularly appropriate and effective where there is a set or sequence of graphics textures that represent, e.g., a volume that is changing over time (such as an explosion or some sort of liquid effect). In this case, either within the volume itself, or for successive volumes, there may be similar data regions in layers of the volume that motion estimation can accordingly be used to, potentially significantly, compress. In this case, motion estimation may, e.g., be used as between respective frames representing different layers of the same volume texture and/or between respective frames representing layers of different volume textures (e.g. in the case where a sequence of volume textures is being used).

The video encoding process may also be, and is in an embodiment, otherwise tuned and/or optimised to allow for the fact that graphics textures (rather than frames of video) are being encoded. In an embodiment, when a volume texture is being encoded, the video encoding process is configured and/or tuned to take account of the fact that a three dimensional volume is, in effect, being encoded, rather than simply a sequence of two dimensional images.

The video frames encoding the graphics textures can be provided to the video decoder for decoding in any suitable and desired manner. For example, the video frames could be streamed or downloaded to the data processing system from remote storage, and/or be provided from a portable storage medium that is accessible to the data processing system. For example, the video frames could be stored on a hard drive or flash memory, or a Cloud-based renderer could generate the textures and compress them as video frames and then stream those video frames to the video decoder "on-the-fly".

In use, the video frame or frames would then be stored in memory of or accessible to the video decoder such as RAM of the data processing system, from where they could then be read and decoded by the video decoder.

Thus, in an embodiment, the video frame or frames encoding the graphics textures are stored in memory of or accessible to the data processing system (e.g. after they have been downloaded or read from a portable storage medium), from where they can then be read for decoding by the video decoder. The encoded video frames are in an embodiment stored in main memory of or accessible to the data processing system (which memory is, accordingly, in an embodiment external to any System-on-Chip comprising the graphics processor and the video decoder), but other arrangements would be possible, if desired.

The video decoder can decode the video frame or frames representing a graphics texture in any suitable and desired manner. This should be, and is in an embodiment, done using the appropriate video decoding process (corresponding to the video encoding process that was used to encode the texture as a video frame or frames). Thus, to decode the video frames to provide the graphics texture or textures for use by the graphics processor, the video decoder should perform the appropriate video decoding operation.

The video decoder may decode the entire graphics texture in question (and in an embodiment that is what is done), or it may only decode a part (some but not all) of the graphics texture in question (and in an embodiment, this is done). It may be appropriate to only decode a part but not all of the graphics texture where, for example, only a part of the graphics texture is required by the graphics processor. For example, in the case of a volume texture, the video decoder may decode only some but not all of the layers of the volume texture, if desired.

Correspondingly, the video decoder may encode all of the video frame or frames representing the texture (e.g. where the entire texture is to be decoded), or may only decode some but not all of the frames representing the texture (where less than all of the texture is to be decoded and the texture is encoded using plural video frames), and/or may decode only part (some) but not all of a video frame encoding the texture (e.g. where only part of the texture is to be decoded, and that part is less than an entire video frame encoding the texture).

The decoding process should and in an embodiment does decode the video frame or frames representing the texture so as to provide appropriate texture data for use by the graphics processor. Thus the video decoder in an embodiment decodes the video frame or frames representing the texture so as to produce an appropriate array of texture data elements for use by the graphics processor as a texture.

The video decoder could decode the video frame or frames representing the texture so as to provide the texture data in some form of "intermediate" representation that then requires further processing, e.g., and in an embodiment, by the graphics processor, before the texture data is suitable for use for, and used for, generating a render output.

In an embodiment the video decoder decodes the video frame or frames representing the texture so as to produce an appropriate array of texture data elements representing the texture in a form suitable for use by the graphics processor, e.g., and in an embodiment, without the need for any further decoding or processing of the texture by the graphics processor before using it for generating a render output.

Once the video decoder has decoded the video frames to provide some or all of a graphics texture for use by the graphics processor, the video decoder then stores the decoded graphics texture or textures that it generates from the video frame(s) appropriately in memory for use by the graphics processor.

The memory where the video decoder stores the decoded graphics textures can be any suitable and desired memory of and/or accessible to the data processing system that the graphics processor and video decoder are part of. Again, this is in an embodiment main memory, e.g. that is external to and off-chip from any System-on-Chip that the graphics processor and video decoder are part of. Other arrangements could also or instead be used, if desired. For example, where the data processing system includes a buffer memory and/or cache (e.g. L3 cache) that is sufficiently large for this data, then the decoded texture(s) may also or instead be stored there for use by the graphics processor.

The video decoder can store the decoded graphics textures in the memory to be used by the graphics processor in any suitable and desired manner. For example, in the case of a volume texture, each layer of the volume texture could simply be stored one after another in memory.

In an embodiment, the video decoder stores the decoded graphics texture(s) in memory for use by the graphics processor in such a way (in such a configuration) that any caching of that texture data when the graphics processor uses the texture data should be more efficient (so as to enhance the efficiency of any caching operation for, and any caching of, the graphics texture or textures in use).

This is in an embodiment based on any spatial coherence and/or locality of the texture data elements in the texture, such that, for example, and in an embodiment, any given memory read (memory burst) for any particular texture data element of the texture that will also fetch additional texture data (texture data elements) to the wanted texture data (texture data element(s)) (e.g. because of the burst size) is more likely to fetch additional texture data (texture data elements) that is also likely to be used (needed) by the graphics processor.

For example, in the case of a volume texture, in an embodiment, the video decoder is configured to interleave the storing of (data for) different layers of the volume texture (e.g. on a row by row, or set of rows, basis) when storing the decoded volume texture for use by the graphics processor. This will then have the effect that any fetch of data for a particular texture position within the volume texture will be likely to fetch data in the volume surrounding that position, thereby increasing the likelihood that the fetched data will be needed and used by the graphics processor (and, correspondingly, potentially reducing the number of fetches from memory that may be required to fetch a given volume of texture data positions within the volume texture).

Thus, in an embodiment, the storing of the decoded texture data is for use by the graphics processor is configured, in an embodiment by interleaving it, so as to increase, and in an embodiment maximise, cache locality.

Other arrangements would, of course, be possible.

The video decoder can be controlled and triggered to decode video frames encoding graphics textures in any suitable and desired manner. For example, the video decoder may simply be controlled (e.g. by an application executing on a host processor) to decode the video frame or set or sequence of video frames, e.g. that are stored in memory and/or that are being streamed to the video decoder.

The video decoder, may, e.g., signal to the graphics processor and/or to a host processor of the system (e.g. to an application on a host processor of the system) once it has completed decoding the necessary graphics textures and stored those textures in memory, that those textures are available for use by the graphics processor.

In an embodiment, the video decoder can also, or instead (and in an embodiment also), be triggered to decode video frames encoding graphics textures in use, and most in an embodiment in an "on demand" manner.

In an embodiment, the graphics processor can itself control the video decoder to decode a video frame or frames encoding a graphics texture (in an embodiment that the graphics processor needs), in an embodiment in an on demand fashion as the graphics processor is performing graphics processing (e.g. generating an output frame or frames for display). Such arrangements can be achieved as desired, e.g., and in an embodiment, by the graphics processor being able to communicate a request for decoding a video frame encoding a graphics texture, in an embodiment directly, to the video decoder. This may be done, e.g., via appropriate drivers, and/or through a communication path (e.g. bus) between the graphics processor and video decoder.

Thus, in an embodiment, the graphics processor is operable to identify in use a need for a graphics texture, and in response to such identification, send a request to the video decoder to decode the video frame encoding the graphics texture, with the video decoder in response to such a request decoding the video frame encoding the graphics texture and storing the decoded graphics texture in memory for use by the graphics processor. The video decoder is in an embodiment also operable to signal to the graphics processor when the texture has been stored in memory (is available in a memory for use).

Allowing the graphics processor to request decoding of video frames encoding graphics textures in an on demand fashion may be of particular use, for example, where the graphics processor is able to use (and using) "sparse" ("partially resident") textures, i.e. in situations where a texture is so large that the whole (entire) texture cannot be stored in memory at once (or it is not desired to store the entire texture memory at once), but instead smaller regions, such as tiles, of the texture are loaded and unloaded into and out of memory as needed.

In this case, the graphics processor could be configured to, when it recognises that a region of a texture that it requires is not present in memory, trigger the video processor in an on demand fashion to generate and store in memory the missing region of the texture. This may then facilitate faster re-filling of missing regions of sparse textures, e.g., potentially with sub-frame latency, where the video decoder can generate missing regions of a texture at a faster rate than the rate at which the graphics processor is generating output frames.

For example, for a sparse texture the whole possible texture could be set up in the virtual address space but with only a subset of the virtual pages mapped to physical pages. Pages that are not mapped to physical pages could still have information relating to what would need to be decoded. The hardware, e.g. the graphics processor, e.g. through a command processor, e.g. available on the graphics processor, could then inform the video decoder what texture data will (ideally) be needed for the next frame (and possibly remove old data that is no longer needed), with the video decoder then decoding that data and making it available for a subsequent frame.

Indeed, it is believed that the technology described herein, when configured to operate in this manner, may be particularly useful for use with such sparse or partially resident textures, e.g. when streaming data into, for example, a game. Thus, in an embodiment, the graphics processor is configured to, when it identifies a texture data miss in a (sparse) texture, trigger the video decoder to, in an embodiment immediately, decode the missing texture data from a video frame or frames encoding the texture.

The graphics processor can use the decoded graphics texture stored by the video decoder in any suitable and desired manner, e.g., and in an embodiment, in the normal manner for the type of graphics texture in question.

Thus the decoded texture data element values are in an embodiment sampled for, and applied to, sampling positions and/or fragments that are being rendered, to generate rendered data for those sampling positions and/or fragments, which rendered data is then used for the rendering output being generated.

The render output that the graphics processor is generating using (at least in part) the decoded graphics texture can be any suitable and desired render output that a graphics processor and graphics processing pipeline can produce.

In an embodiment the render output that the graphics processor is generating is an output frame, in an embodiment an image, e.g., and in an embodiment, for display. The technology described herein could be used for other forms of render output that a graphics processor may produce, such as, for example, a texture (in render-to-texture operation) or other render outputs.

The render output generated by the graphics processor is in an embodiment appropriately stored, e.g. written to a frame buffer, e.g. for a display.

The render output(s) generated by the graphics processor can be stored in any suitable and desired manner. They are in an embodiment stored in appropriate buffers. For example, the render output, such as an output frame, generated by the graphics processor is in an embodiment stored in an output frame buffer.

The output frame buffer may be an on-chip buffer or it may be an external buffer. Similarly, the output frame buffer may be dedicated memory for this purpose or it may be part of a memory that is used for other data as well.

Although the technology described herein has been described above primarily with reference to the encoding and decoding of a single graphics texture, as will be appreciated by those skilled in the art, the technology described herein can be, and is in an embodiment, used for plural graphics textures, e.g., for a set or sequence of graphics textures, and/or for plural render outputs (e.g. output frames) to be generated. For example, the technology described herein could be used for handling and processing a sequence of volume textures, e.g., representing a volume that changes over time (such as an explosion or some sort of liquid effect).

The video decoder and/or video encoder of the technology described herein can be any suitable and desired video decoding and/or video encoding circuitry, such as, for example, dedicated, fixed function processing circuitry for performing the encoding and/or decoding operations, and/or programmable processing circuitry that can be programmed to operate in the desired manner.

The video decoder and/or encoder may be provided as separate, standalone elements of the data processing system. In an embodiment they are provided as part of a video processor (video processing unit) of the data processing system. Thus, in an embodiment, the data processing system includes a video processor (a video processing unit (VPU)) that performs the decoding and/or encoding operations (and that includes appropriate encoding and/or decoding processing circuitry).

The graphics processor of the data processing system can correspondingly be any suitable and desired graphics processor that is able to use graphics textures when and for generating a render output.

The technology described herein is applicable to any suitable form or configuration of graphics processor and renderer, such as tile-based graphics processors, immediate mode renderers, processors having a "pipelined" rendering arrangement, etc.

Subject to any hardware necessary to carry out the specific functions discussed above, the graphics processor can otherwise include any one or more or all of the usual functional units, elements and/or stages, etc., that a graphics processor can include.

Thus, for example, the graphics processor in an embodiment includes a primitive setup stage, a rasteriser and a renderer. In an embodiment the renderer is in the form of or includes a programmable fragment shader.

In the case of a tile-based graphics processor, the graphics processor in an embodiment also comprises a tile buffer for storing tile sample values and/or a write out unit that operates to write the data in the tile buffer (e.g. once the data in the tile buffer is complete) out to external (main) memory (e.g. to a frame buffer).

The graphics processor in an embodiment comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor may also contain any other suitable and desired processing stages that a graphics processor may contain such as a depth (or depth and stencil) tester(s), a blender, a write out unit etc.

As well as the graphics processor, and the video decoder and/or encoder, and the memory, the data processing system of the technology described herein can contain any other desired and appropriate and suitable elements and components.

In an embodiment, the data processing system at least includes a host processor that executes applications that can require graphics processing by the graphics processor. To facilitate this, the host processor in an embodiment executes a driver for the graphics processor and a compiler or compilers for compiling shader programs to be executed by programmable shading stages of the graphics processor (which compiler may be, and in an embodiment is, a part of the driver).

Similarly, the data processing system in an embodiment has and/or is in communication with a display for displaying images generated by the graphics processor, etc.

Thus the data processing system should (and in an embodiment does) produce some useful output data, e.g. graphics processing output data for use in (subsequent) graphics processing operations etc. In an embodiment, the generated output data is used to provide an image for display, e.g. is provided to a display for display.

In an embodiment, the data processing system comprises, and/or is in communication with, one or more memories and/or memory devices that store the data described herein, and/or that store software for performing the processes described herein.

Thus, in an embodiment the data processing system may, and in an embodiment does, contain one or more of, and in an embodiment all of: a CPU, a GPU, a video processor, a display controller, a display (e.g. an LCD or an OLED display), and appropriate memory for storing the various render outputs, textures, and other data that is required.

In an embodiment, at least the CPU, GPU, video decoder/encoder (processor) and/or display controller of the data processing system is implemented and configured as a system on-chip (SoC). The system on-chip in an embodiment has appropriate communication links for communicating, e.g., and/or in an embodiment with a display and with external memory.

The technology described herein can be implemented in any suitable system, such as a suitably configured microprocessor based system. In some embodiments, the technology described herein is implemented in computer and/or micro-processor based system.

The technology described herein is in an embodiment implemented in a portable device, such as, and in an embodiment, a mobile phone or tablet.

It is believed that the technology described herein may be particularly applicable to virtual reality display devices such as virtual reality headsets.

Thus, another embodiment of the technology described herein comprises a virtual reality display device comprising the data processing system of any one or more of the embodiments of the technology described herein. Correspondingly, another embodiment of the technology described herein comprises a method of operating a virtual reality display device, comprising operating the virtual reality display device in the manner of any one or more of the embodiments of the technology described herein.

The various functions of the technology described herein can be carried out in any desired and suitable manner. For example, the functions of the technology described herein can be implemented in hardware or software, as desired. Thus, for example, the various functional elements, stages, etc., of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor(s), and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, video processor, data processing or other system comprising a data processor causes in conjunction with said data processor said processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre- loaded with a computer system, for example, on a system ROM or fixed disk, or distributed from a server or electronic bulletin board over a network, for example, the Internet or World Wide Web.

A number of embodiments of the technology described herein will now be described.

Figure 2:
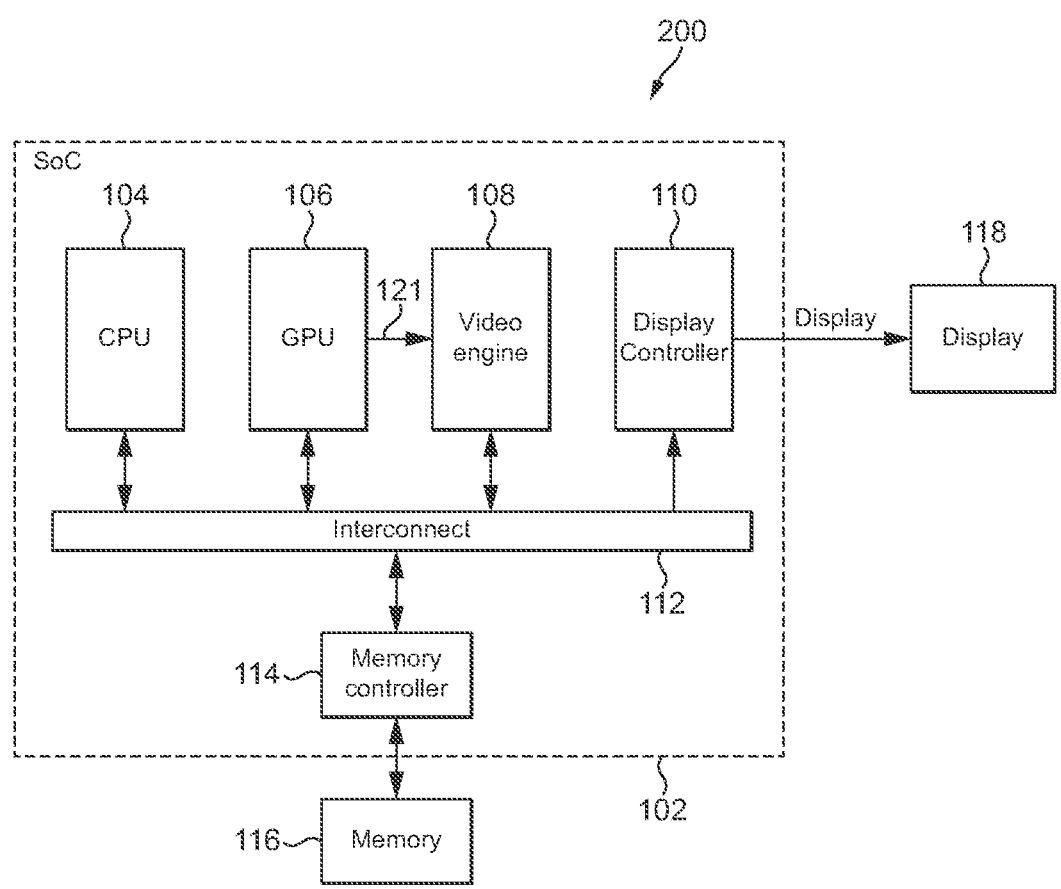
FIG. 2 shows an embodiment of the data processing system of the technology described herein.

FIG. 2 shows a data processing system 200 an embodiment of the technology described herein. This data processing system basically corresponds to the data processing system shown in FIG. 1, and thus comprises a system on chip (SoC) 102, (main) memory 116, and a display 118, with the SoC 102 comprising a central processing unit (CPU) 104, a graphics processing unit (GPU) 106, a video (decoding) engine 108, a display controller 110, an interconnect 112 and a memory controller 114.

The CPU 104, GPU 106, video engine 108, and display controller 110 again communicate with each other via the interconnect 112 and with the memory 116 via the interconnect 112 and memory controller 114. The display controller 110 also communicates with the display 118.

In the present embodiment, and in accordance with the technology described herein, the video engine 108 can be and is used to decode encoded frames of video data that represent graphics textures to be used by the graphics processor 106. The video engine 108 can also be used to encode graphics textures generated by the graphics processor 106 as video frames.

Correspondingly, as shown in FIG. 2, the graphics processor 106 has a request channel 121 to the video engine 108 whereby it can request and queue encoded graphics texture decoding tasks (jobs) for the video engine 108.

To do this, graphics textures for use by the graphics processor 106 are stored as encoded frames of video data in the memory 116. The video engine 108 then reads the video frame or frames encoding the graphics texture or textures from the memory 116, decodes those video frames to reproduce the graphics texture(s) that the video frames encode, and stores the decoded graphics texture or textures in the memory 116.

The graphics processor 106 can then read the decoded graphics textures from the memory 116 for use when generating its render outputs, such as, e.g., and in an embodiment, output frames for display. The render output, e.g. output frames, generated by the graphics processor 106 may correspondingly then be stored in appropriate frame buffers in the memory 116, from where they may then, e.g., be read by the display controller 110 and provided to the display 118 for display.

The decoding of a graphics texture by the video engine 108 may be triggered, e.g., by a driver on the CPU 4 for the video engine 108 triggering that operation. Additionally, or alternatively, and as shown in FIG. 2, the graphics processor 106 may directly request and trigger the decoding of a graphics texture by the video engine 108 via the request channel 121. Such "on demand" triggering of the decoding of graphics textures by the video engine 108 will be discussed in more detail below.

Figure 3:
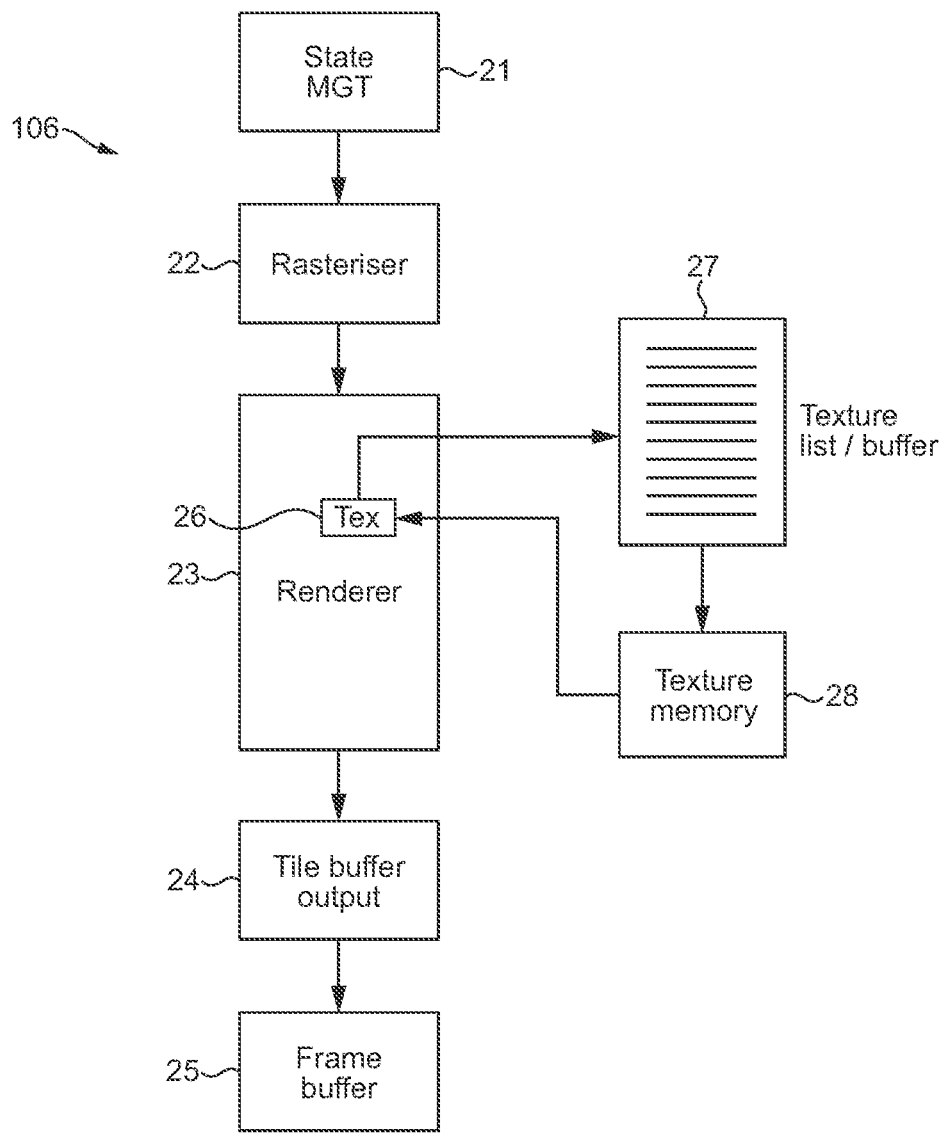
FIG. 3 shows schematically a graphics processor that can be used in an embodiment of the technology described herein.

FIG. 3 shows schematically an arrangement of a graphics processor 106 that can use textures that have been decoded in accordance with the present embodiment.

FIG. 3 shows the main elements and pipeline stages of the graphics processor 106 that are relevant to the operation of the present embodiment. As will be appreciated by those skilled in the art there may be other elements and stages of the graphics processor (graphics processing pipeline) that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc., of the graphics processing pipeline as shown in FIG. 3 may be implemented as desired and will accordingly comprise, e.g., appropriate circuitry and/or processing logic, etc., for performing the necessary operation and functions.

In this embodiment, the graphics processor 106 is a tile-based rendering system. However, other arrangements are, of course, possible.

(In tile-based rendering, rather than the entire render output, e.g., frame, effectively being processed in one go as in immediate mode rendering, the render output, e.g., frame to be displayed, is divided into a plurality of smaller sub-regions (areas), usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

As shown in FIG. 3, the graphics processor 106 includes, and implements, a graphics processing pipeline that includes a state management system 21, a rasterising stage 22, and a rendering stage 23 (in the form of a rendering pipeline).

The state management system 21 stores and controls state data and the state of the graphics processor's processing units to control the graphics processing operation.

The rasteriser 22 takes as its input primitives to be displayed, and rasterises those primitives to sampling positions and generates fragments to be rendered.

The rendering pipeline 23 takes fragments from the rasteriser 22 and renders those fragments for display. The rendering pipeline 23 will include a number of different processing units, such as fragment shaders, blenders, texture mappers, etc.

The output from the rendering pipeline 23 (the rendered fragments) is output to tile buffers 24 (since the present embodiment is a tile-based system). The tile buffers' outputs are then finally output to a frame buffer 25, e.g. for display. (The render output may typically be an output frame intended for display on a display device, such as a screen or printer.)

FIG. 3 also shows schematically particular features of the graphics processor 106 that are provided in order for it to use textures decoded in the manner of the present embodiment.

In particular, as shown in FIG. 3, the rendering pipeline 23 includes a texture mapping stage 26 configured to be able to access a texture list buffer 27 to determine a texture needed for texturing a fragment that it receives for rendering.

The texture list buffer 27 will indicate the texture that is required, and then the texture mapper 26 will fetch the relevant texture data from a memory 28 and used the fetched texture data to process the fragment in question.

The textures stored in the memory 28 may be textures that are decoded from encoded video frames by the video engine 108.

Figure 4:
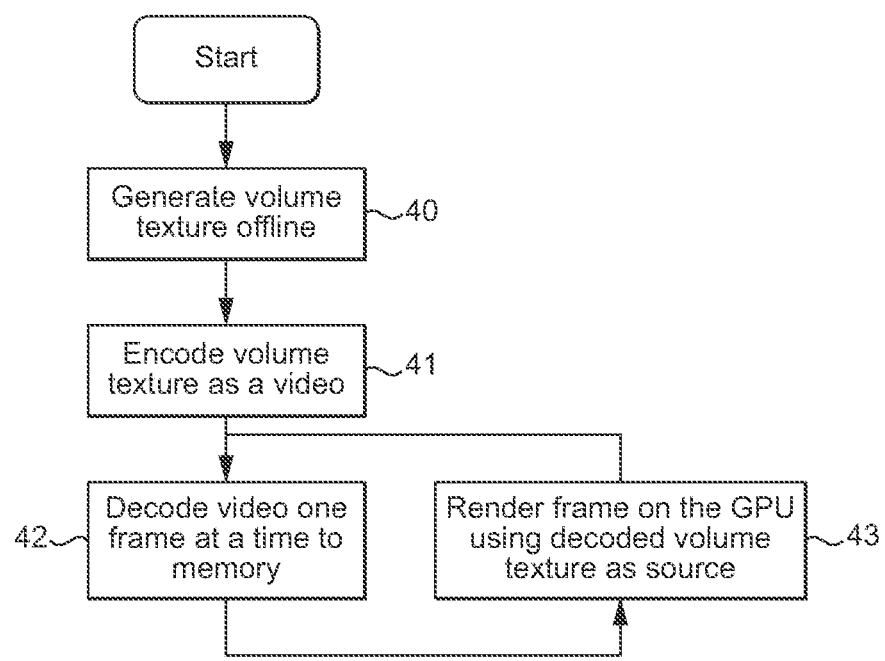
FIG. 4 shows schematically the operation of a data processing system in an embodiment of the technology described herein.

FIG. 4 shows schematically the operation of encoding a texture to be used by the graphics processor 106 as a frame or frames of video data, and then the subsequent decoding of that encoded video data to reproduce the texture, and the use of the texture to render an output frame by the graphics processor 106.

As shown in FIG. 4, the process starts by generating the graphics texture to be used and encoded as a frame or frames of video data (step 40). In the present embodiment, and as shown in FIG. 4, it is assumed that the graphics texture in question is generated "offline", e.g. when preparing the data for the application, e.g. game, to which the texture relates.

It is also assumed in this example that, as shown in FIG. 4, the texture in question is a volume texture, i.e. a three-dimensional array of texture data elements (voxels) representing, e.g., respective colours at particular positions within the volume that the texture represents. Such a 3D volume texture could comprise, e.g., a 128×128×128 cube of texture data elements (voxels). Such a volume texture may be used to provide, e.g., a pre-rendered volume effect, e.g., where the processing, etc., cost of simulating the volume on the graphics processor in use may be undesirably large.

In the present embodiments, such a volume texture is represented as a sequence of two-dimensional textures (images), one for each slice (layer) of texture data elements (voxels) in the 3D volume. Thus, for example, a 128×128×128 cube of voxels will be represented as 128 different 128×128 2D textures.

Once the volume texture has been generated, it is then encoded as a video frame or sequence of video frames (step 41).

In the case of a volume texture, the volume texture may be encoded, e.g., as a sequence of video frames, with each frame representing one layer (slice) of the volume texture. Alternatively, each layer (slice) of the volume texture could be mapped into, e.g., a single video frame, e.g. by horizontal stacking. This latter arrangement may reduce the frame overhead when encoding and decoding the volume texture, but on the other hand mapping a volume texture as a sequence of video frames may facilitate using other video compression optimisations, such as motion estimation.

Figure 5:
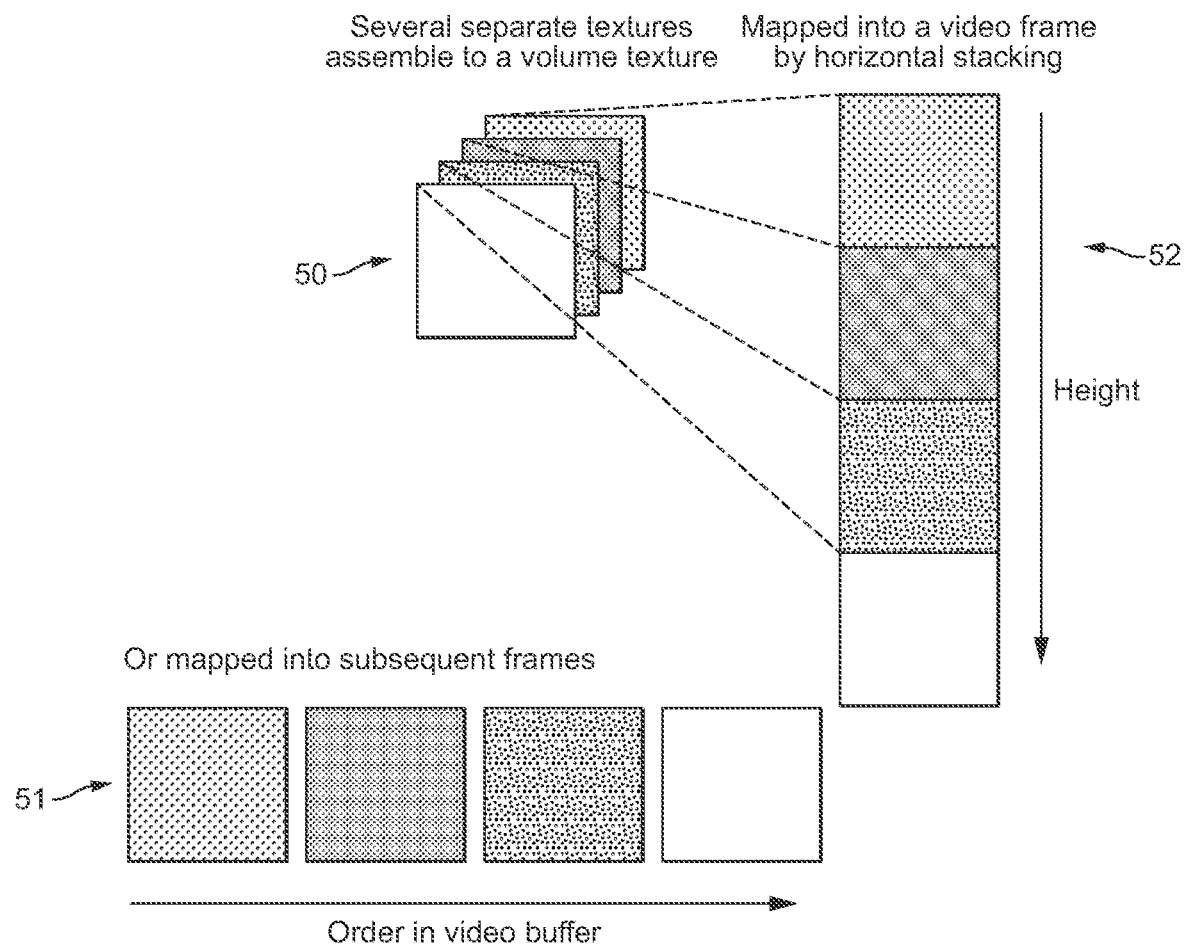
FIGS. 5 and 6 show schematically the encoding of a volume texture as a video frame or frames in embodiments of the technology described herein.

FIG. 5 illustrates these alternatives and shows the mapping of successive layers of a volume texture 50 either into a sequence of separate video frames 51 or into a single video frame by horizontal stacking 52. In the latter case, the different volume texture layers in the video frame may be identified, e.g., by indicating the memory stride between different layers in the frame.

The actual encoding of the texture data as a video frame or frames can be performed in any suitable and appropriate manner, e.g. depending upon the video encoding scheme (e.g. standard) being used.

In an embodiment, the video encoding uses any video encoding optimisations that may be appropriate and suitable, such as and in an embodiment, motion estimation. For example, in the case of a volume that changes over time, such as an explosion or some sort of liquid effect, motion estimation may be used to identify and exploit any duplication or redundancy between respective layers within the volume texture and/or between successive versions of the volume texture (e.g. where the volume that the texture represents is changing over time).

Figure 6:
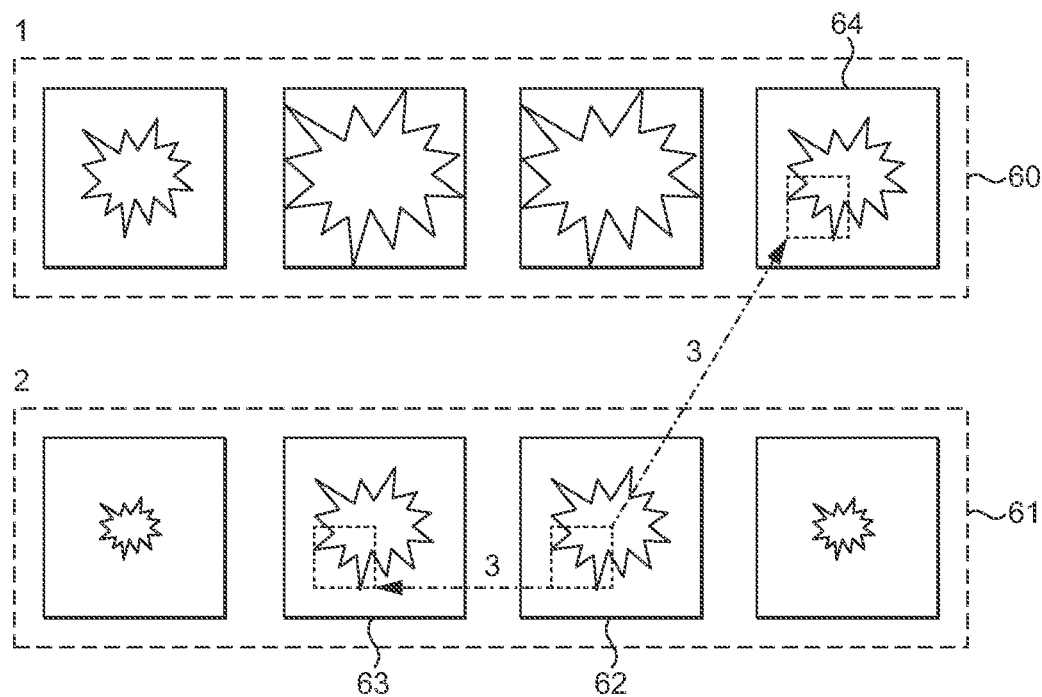

FIG. 6 illustrates the use of motion estimation when encoding as frames of video two volume textures 60, 61 representing respective volumes of an explosion that is getting smaller (in the second volume texture 61).

In each case, as shown in FIG. 6, the respective volume texture representing the explosion at the point in time in question comprises four depth layers 62 that make up the volume, with each such depth layer being encoded as a separate video frame.

As shown in FIG. 6, motion estimation for a given frame encoding a layer of a volume texture can be done from any previous video frame, including frames representing different layers of the same volume texture. For example, with respect to the third frame 62 for the second volume texture 61, motion estimation can be performed for that frame both using a previous frame 63 representing another layer of the same volume texture 61, and a previous frame, such as the frame 64, representing a layer of the previous (in time) volume texture 60.

Once the volume texture has been encoded as a video frame or sequence of video frames in step 41, it may then, e.g., be stored or appropriately streamed to a data processing system that wishes to use the so-encoded textures to generate graphics processor render outputs.

As shown in FIG. 4, to use the graphics textures that have been encoded as video frames, the video processor 108 of the data processing system 200 will decode the video frames encoding the graphics textures one volume frame at a time and store the decoded textures in the memory 116 (step 42).

The graphics processor 106 will then render an output frame using the decoded texture stored in the memory 116 by the video processor 108 (step 43).

This process may be repeated for as many output frames and graphics textures are required.

As discussed above, and as shown in FIG. 2, in the present embodiments the graphics processor 106 has a request channel 121 to the video processor 108 to allow it to trigger the decoding of graphics textures by the video processor 108 in an "on demand" fashion. This may be used for example, when using sparse (partially resident) textures, e.g. when streaming data into, for example, a game. In this case, the graphics processor 106 could recognise a miss in the sparse texture and signal a request via the channel 121 to the video processor 108 to immediately decode the missing texture data. This could enable very fast refill of missing textures.

It can be seen from the above that the technology described herein, in its embodiments at least, can provide an improved arrangement for the handling and use of graphics textures in data processing systems. This is achieved, in embodiments of the technology described herein at least, by encoding graphics textures as frames of video data, and then using a video decoder to decode and provide the textures for use by a graphics processor.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system that comprises a video decoder, a graphics processor comprising one or more programmable shading stages, a host processor that executes applications which require graphics processing by the graphics processor and a driver for the graphics processor, and a memory for storing data generated by or to be used by the video decoder and the graphics processor, wherein the video decoder, the graphics processor and the host processor are separate units of the data processing system, the method comprising:

when the graphics processor is performing graphics processing required by an application executing on the host processor:

the video decoder decoding some or all of a graphics texture that has been encoded as a video frame or frames and storing the decoded graphics texture in the memory; and the graphics processor reading the decoded texture stored in the memory by the video decoder and using the texture to generate a render output for the application being executed by the host processor.

2. The method of claim 1, wherein:

the data processing system includes a video encoder; and the method further comprises:

the graphics processor generating a graphics texture as a render output and storing the graphics texture in the memory of the data processing system; and the video encoder then reading the stored graphics texture from the memory, encoding the graphics texture as one or more frames of video data using a video encoding process, and then storing the encoded texture in the memory.

3. The method of claim 1, wherein:

the graphics texture that is encoded as a video frame or frames comprises a volume texture.

4. The method of claim 1, wherein:

the encoding of a graphics texture as a video frame or frames uses motion estimation to try to compress the texture data.

5. The method of claim 1, wherein:

the video decoder decodes only a part of the graphics texture.

6. The method of claim 1, wherein:

the texture being decoded is a volume texture; and the video decoder interleaves data for different layers of the volume texture when storing the decoded volume texture for use by the graphics processor.

7. The method of claim 1, comprising:

the graphics processor identifying by processing circuitry a texture data miss in a texture that it is using; and, in response thereto:

triggering by processing circuitry the video decoder to decode the missing texture data from a video frame or frames encoding the texture.

8. A data processing system, comprising:

a host processor;

a video decoder;

a graphics processor; and a memory that stores data generated by or to be used by the video decoder and the graphics processor;

wherein:

the host processor, the video decoder and the graphics processor are separate units of the data processing system;

the graphics processor comprises one or more programmable shading stages;

the host processor executes applications which require graphics processing by the graphics processor and a driver for the graphics processor;

the video decoder decodes some or all of a graphics texture that has been encoded as a video frame or frames and stores the decoded graphics texture in the memory; and the graphics processor reads a decoded texture stored in the memory by the video decoder and uses the texture to generate a render output for an application being executed by the host processor.

9. The system of claim 8, wherein:

the data processing system includes a video encoder; and the graphics processor generates a graphics texture as a render output and stores the graphics texture in the memory of the data processing system; and the video encoder reads a stored graphics texture from the memory, encodes the graphics texture as one or more frames of video data using a video encoding process, and then stores the encoded texture in memory.

10. The system of claim 8, wherein:

the graphics texture that is encoded as a video frame or frames comprises a volume texture.

11. The system of claim 8, wherein:

the encoding of a graphics texture as a video frame or frames uses motion estimation to try to compress the texture data.

12. The system of any one of claim 8, wherein:

the video decoder decodes only a part of the graphics texture.

13. The system of claim 8, wherein:

the video decoder operates to, when the texture being decoded is a volume texture, interleave data for different layers of the volume texture when storing the decoded volume texture for use by the graphics processor.

14. The system of claim 8, wherein:

the graphics processor controls the video decoder to decode a video frame or frames encoding a graphics texture.

15. The system of claim 8, wherein:

the data processing system includes a video processor that performs the video decoding and/or encoding operations.

16. A virtual reality display device comprising the data processing system of claim 8.

17. A non-transitory computer readable storage medium storing computer software code which when executing on at least one processor performs a method of operating a data processing system that comprises a video decoder, a graphics processor comprising one or more programmable shading stages, a host processor that executes applications which require graphics processing by the graphics processor and a driver for the graphics processor, and a memory for storing data generated by or to be used by the video decoder and the graphics processor, wherein the video decoder, the graphics processor and the host processor are separate units of the data processing system, the method comprising:

when the graphics processor is performing graphics processing required by an application executing on the host processor:

the video decoder decoding some or all of a graphics texture that has been encoded as a video frame or frames and storing the decoded graphics texture in the memory; and the graphics processor reading the decoded texture stored in the memory by the video decoder and using the texture to generate a render output for the application being executed by the host processor.

* * * * *